United States Patent
Harris et al.

(10) Patent No.: US 7,680,487 B2
(45) Date of Patent: Mar. 16, 2010

(54) METHOD AND APPARATUS TO FACILITATE SCHEDULING TRANSMISSIONS TO GROUP RECIPIENTS

(75) Inventors: John M. Harris, Chicago, IL (US); Ronald T. Crocker, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 1236 days.

(21) Appl. No.: 11/211,279

(22) Filed: Aug. 25, 2005

(65) Prior Publication Data

US 2007/0049300 A1    Mar. 1, 2007

(51) Int. Cl.
*H04L 12/58* (2006.01)
(52) U.S. Cl. ............... 455/412.1; 455/466; 455/343.2; 379/88.22
(58) Field of Classification Search ... 455/412.1–412.2, 455/343.2, 466; 379/88.22
See application file for complete search history.

(56) References Cited

U.S. PATENT DOCUMENTS

| | | | |
|---|---|---|---|
| 5,596,571 A * | 1/1997 | Gould et al. | 370/335 |
| 6,289,227 B1 * | 9/2001 | Shi | 455/574 |
| 6,505,058 B1 * | 1/2003 | Willey | 455/574 |
| 6,687,285 B1 * | 2/2004 | Jou | 375/133 |
| 6,725,053 B2 * | 4/2004 | Rosen et al. | 455/518 |
| 2002/0029238 A1 | 3/2002 | Okuhata | |
| 2002/0191583 A1 * | 12/2002 | Harris et al. | 370/345 |
| 2004/0131075 A1 | 7/2004 | Sinnarajah et al. | |
| 2005/0036464 A1 | 2/2005 | Rajkotia et al. | |
| 2005/0164705 A1 | 7/2005 | Rajkotia et al. | |
| 2005/0164718 A1 | 7/2005 | Rajkotia et al. | |
| 2005/0164741 A1 | 7/2005 | Rajkotia et al. | |

* cited by examiner

*Primary Examiner*—Simon Sing
(74) *Attorney, Agent, or Firm*—Lalita W. Pace

(57) ABSTRACT

Upon detecting (201) a communication need for a group of communication recipients that entails attempting to make at least one transmission to each of the communication recipients in the group (wherein at least one of the communication recipients has both a scheduled personal communication opportunity and a scheduled group communication opportunity), one automatically uses (202) whichever of the scheduled communication opportunities occurs first to make the at least one transmission to the communication recipient(s) for which this option applies. In one approach this response is further informed and influenced by one or more other factors, such as but not limited to system loading (203), group size and/or known whereabouts (204), and/or whether a recent transmission response was received (205).

14 Claims, 3 Drawing Sheets

METHOD AND APPARATUS TO FACILITATE SCHEDULING TRANSMISSIONS TO GROUP RECIPIENTS

TECHNICAL FIELD

This invention relates generally to communication systems and more particularly to group-based transmissions.

BACKGROUND

Communication systems of various kinds are known in the art. Some communication systems support one or more communication needs for groups of communication recipients. For example, some systems permit a given user-based message to be transmitted to each of a plurality of individual communication recipients (such as, but not limited to, two-way wireless communication devices such as cellular telephones, push-to-talk devices, and so forth). Some systems facilitate such capability by providing each communication recipient with a scheduled personal communication opportunity. Such an approach may comprise, for example, a particular slot as occurs at a specific consistent location in a recurring slot cycle. As each intended recipient's scheduled personal communication opportunity occurs the communication system transmits the desired content to that particular recipient.

Such an approach, of course, can consume considerable system resources. For example, many individual transmissions may be required to reach a large group of intended recipients using this approach. To avoid this concern, some communication systems provide for an occasional scheduled group communication opportunity. This scheduled group communication opportunity often comprises a particular slot that is monitored by a corresponding group of potential communication recipients. In many typical deployments this scheduled group communication opportunity will not occur with each slot cycle. As a result, considerable delay may be experienced before a given communication need can be met by effecting a one-to-many transmission using a scheduled group communication opportunity such as this.

As noted above, scheduled individual communication opportunities are often viewed as consuming undue system resources while scheduled group communication opportunities sometimes give rise to unacceptable levels of latency. The problems do not stop with only these issues. For example, varying systems and/or varying communication services typically have varying corresponding performance requirements. In some application settings, the time used to contact at least a first member of a group of communication recipients comprises a critical metric. In other application settings, however, the time used to effect contact with the last member of a group of communication recipients may comprise an important metric. Issues such as these and others too numerous to mention render architectural design in this regard difficult.

BRIEF DESCRIPTION OF THE DRAWINGS

The above needs are at least partially met through provision of the method and apparatus to facilitate scheduling transmissions to group recipients described in the following detailed description, particularly when studied in conjunction with the drawings, wherein.

Figure 1:
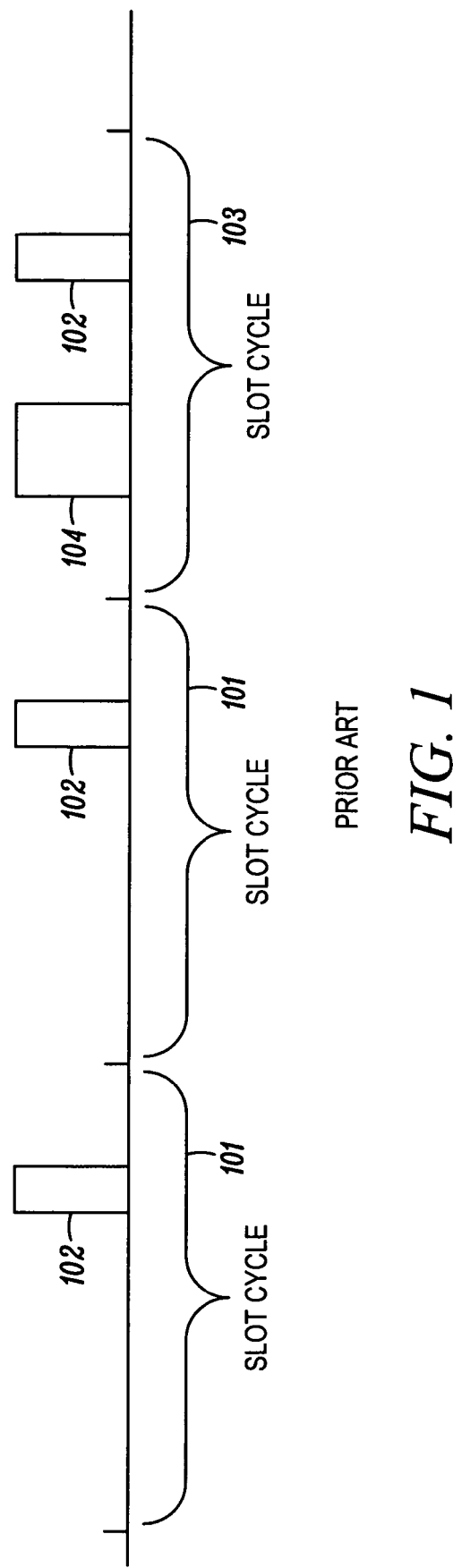
FIG. 1 comprises a schematic view of a slot cycle as configured in accordance with the prior art.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, upon detecting a communication need for a group of communication recipients that entails attempting to make at least one transmission to each of the communication recipients in the group (wherein at least one of the communication recipients has both a scheduled personal communication opportunity and a scheduled group communication opportunity), one automatically uses whichever of the scheduled communication opportunities occurs first to make the transmission to the communication recipient(s) for which this option applies.

In a typical deployment the scheduled personal communication opportunity is likely to occur at least once per each slot cycle whereas the scheduled group communication opportunity is likely to occur less frequently than the scheduled personal communication opportunity. Accordingly, for this and other reasons as well, selection of a first-to-occur opportunity as specified above is, in some embodiments, further informed by consideration of other criteria as well. Examples of such criteria include, but are not limited to, present loading of the system (where a preference for using the first-to-occur opportunity may tend to increase as system loading decreases), a relative size of the group (where a preference for using the first-to-occur opportunity may tend to increase as the size of the group of intended communication recipients decreases), and availability of current location information for specific intended communication recipients (where one may tend to favor using a next scheduled personal communication opportunity instead of the next first-to-occur opportunity for communication recipients having a known present location), to name but a few.

So configured, the varying needs of a variety of communication systems and/or services can be more conveniently met. In particular, considerable flexibility exists to emphasize scheduling behaviors in ways that tend to support rather than detract from desired performance metrics. In general, overall latency can often be improved without causing undue impact on system resource availability. This, in turn, tends to promote a better user experience without sacrificing loading capacity.

These and other benefits may become clearer upon making a thorough review and study of the following detailed description. Referring now to the drawings, and in particular to FIG.

1, it may be helpful to first briefly describe and characterize a general application context within which these teachings may be usefully employed. Viewed generally, a communication channel is divided with respect to time to form a plurality of slot cycles 101. In this illustrative setting, each slot cycle 101 is comprised of a plurality of slots. These slots are typically dedicated (or are at least reserved and/or available) to support specific communication needs. For example, one or more slots (not shown) may be used to convey system information of interest or need.

At least one such slot is used, in this application setting, as a scheduled individual communication opportunity 102 for a given corresponding target recipient (such as a wireless two-way communications device). (In some application settings a number of different target recipients may share the same slot, and hence may share the same scheduled individual communication opportunity. In such a case an identifier may accompany a message to permit the recipients to ascertain whether information as is received during such a slot is indeed intended for them.)

As suggested by the depiction shown in FIG. 1, the individual communication opportunity described above recurs in a similar relative position with respect to the slot cycle 101 itself and on a cyclical basis as the slot cycles 101 repeat over time (hence suggesting that the opportunity be viewed as a "scheduled" opportunity). Also shown in FIG. 1 is a slot cycle 103 that also includes a slot that comprises a scheduled group communication opportunity 104. This scheduled group communication opportunity 104 may substitute for, for example, system control information that might otherwise be transmitted at that respective location of the slot cycle. In a typical application setting this scheduled group communication opportunity 104 can be used to address, simultaneously, a large number of target recipients (wherein the target recipients are programmed to monitor the scheduled group communication opportunity 104 for such group messages).

As already noted earlier, in a typical application setting this scheduled group communication opportunity 104 does not occur as frequently as the scheduled personal communication opportunities 102. So configured, however, and as usefully exploited herein, a given target recipient as comprises a part of a group of target recipients can be contacted either via a scheduled personal communication opportunity or a scheduled group personal communication opportunity as corresponds to that target recipient.

Figure 2:
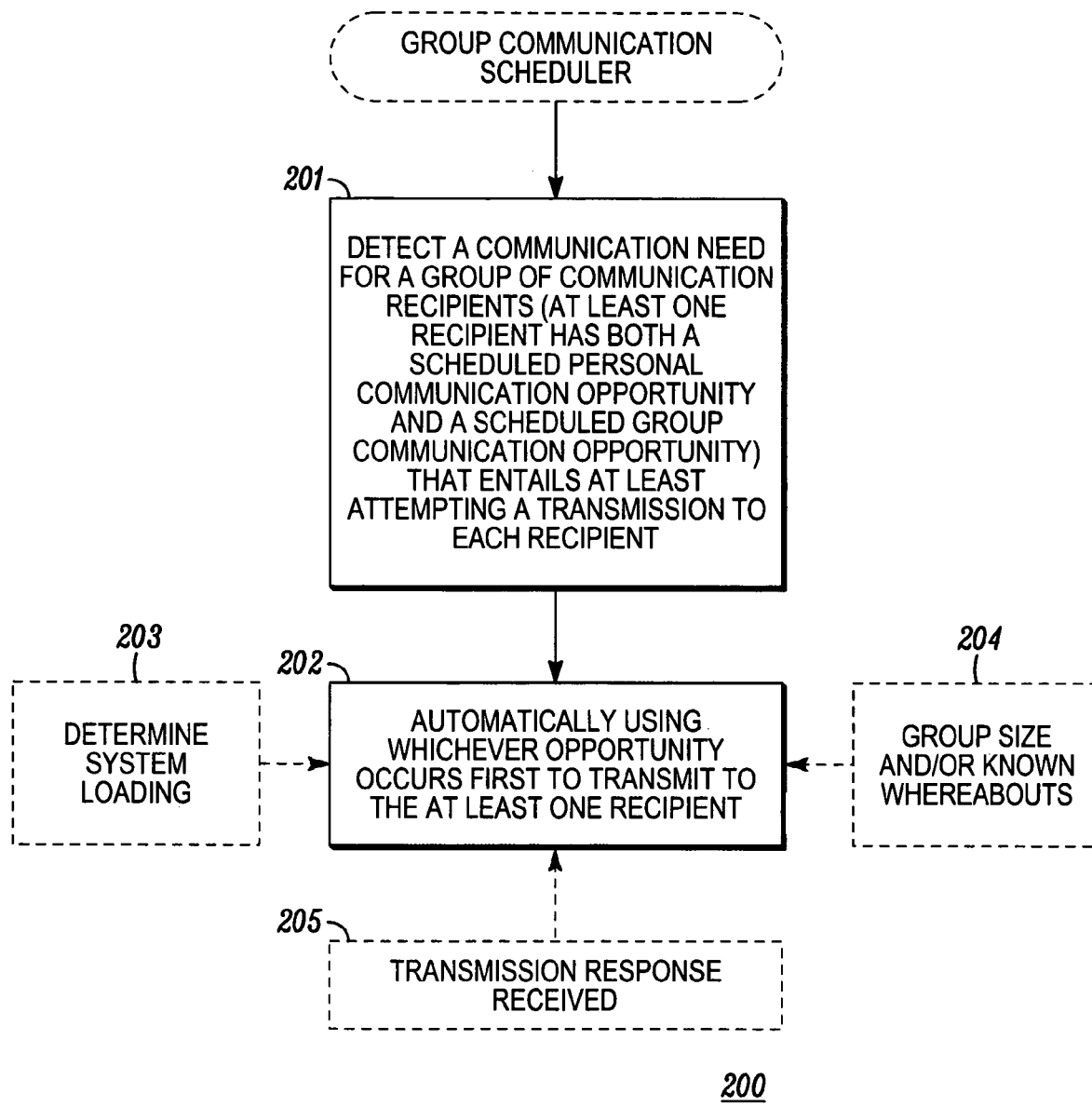
FIG. 2 comprises a flow diagram as configured in accordance with various embodiments of the invention.

Referring now to FIG. 2, a process 200 suitable to be carried out by, for example, a group communication scheduler, will be described.

Pursuant to this process 200, one detects 201 when a communication need for a group of communication recipients occurs, which communication need entails at least attempting to make at least one transmission to each of the communication recipients in the group. These teachings are useful with a wide variety of communication needs including, but not limited to, a need to forward a user message (as part of a one-to-many broadcast, for example), a need to establish a channel to be used to forward at least one user message, and so forth. The at least one transmission referred to above can also comprise any of a wide variety of specific actions including, but not limited to, a page, a user message, and so forth.

In one approach at least one of the communication recipients has both a scheduled personal communication opportunity and a scheduled group communication opportunity. In other approaches, all of the intended communication recipients will be so provisioned. The scheduled personal communication opportunity can comprise, for example, an event that occurs at least once per each slot cycle. The scheduled group communication opportunity can comprise, for example, an event that occurs less frequently than the scheduled personal communication opportunity.

In response to detecting 201 such a need, this process 200 then provides for automatically using 202 whichever of the scheduled personal communication opportunity and the scheduled group communication opportunity occurs first to make the at least one transmission to the corresponding communication recipient(s). For example, if a scheduled group communication opportunity will occur first in time as compared to a next scheduled personal communication opportunity, this process could facilitate favoring the former. In a case where the reverse is true, however, this process could facilitate favoring use of the scheduled personal communication opportunity as versus the scheduled group communication opportunity.

If desired, limits can be used to constrain these choices. For example, this process 200 could further support determining a duration of time until a next opportunity to communicate to a given communication recipient using the scheduled group communication opportunity. One could then automatically use whichever of the scheduled personal communication opportunity and the scheduled group communication opportunity occurs first to make the needed transmission so long as the above-determined duration of time does not exceed a predetermined duration.

The above-described process may be sufficiently complete to render satisfactory performance in at least some communication systems. In other settings, however, it may be desirable to further condition and inform the automatic use 202 of whichever opportunity becomes available first. As a first example, such automatic use 202 of the first available communication opportunity may be conditioned as a function, at least in part, of determined system loading 203 (i.e., information regarding recent, present, and/or likely near-term future active use of the communication system by a particular number of users). As system loading increases, it may become less desirable to employ system resources to contact specific target recipients via their scheduled personal communication opportunities as this may unduly additionally burden the communication system. In such a case, this step of automatically using 202 the earlier communication opportunity can comprise tending to automatically use the scheduled group communication opportunity to make the necessary transmission to the communication recipients as system loading increases. Conversely, as system loading decreases, this step can comprise tending to select whichever communication opportunity arrives earlier as already described.

As another example, this step can be conditioned as a function, at least in part, of communication recipient group size and/or the known (or unknown) whereabouts 204 of the target recipients as comprise the group. As the sheer relative number of communication recipients grows it may again comprise an undue additional burden on the communication system to potentially utilize scheduled personal communication opportunities as described herein. In such a case, this step of automatically using 202 the earliest communication opportunity can comprise tending to automatically use whichever of the scheduled communication opportunities occurs first to make the desired transmission as the communication recipient group size tends to be relatively small. The particular number of communication recipients as may comprise a cut-off or trigger value in this regard will of course vary with the specifics of a given communication system as well as any performance requirements as may be desired and/or required by the system administrator.

This step of tending to automatically use whichever of the scheduled communication opportunities occurs first to make the desired transmission as the communication recipient group size tends to be relatively small is particularly useful when the present whereabouts of at least a substantial number of the communication recipients is unknown. Conversely, when the specific whereabouts of a given communication recipient is known, such knowledge may aid in dictating use of a particular communication opportunity other than as based upon a first-in-time criteria. In such a case, and where the present whereabouts of a significant number of communication recipients is known, then again it may be appropriate to modify this step 202 to tend towards an alternative selection preference other than first-in-time determinations.

As yet another example, this step 202 can be conditioned as a function, at least in part, of whether a transmission response has recently been received 205 for one or more of the communication recipients. More particularly, and if desired, automatic use 202 of the earliest communication opportunity can further comprise determining whether a response to an earlier one of the necessary transmissions to an earlier selected one of the communication recipients has been received, and if so, determining whether a present location for another of the communication recipients to which the necessary transmission has not yet been transmitted is known. In such as case, when at least one communication recipient has responded to the transmission and the present location of another communication recipient (to which the necessary transmission has not yet been made) is known, this step 202 may usefully comprise automatically not using the scheduled personal communication opportunity for the communication recipient having the known location.

This may be useful, for example, in a setting when a communication recipient has responded such that the system knows that a channel assignment will eventually be transmitted in a given sector that includes that communication recipient, and when another as-yet-uncontacted communication recipient is also known to be in that same sector. In such a case it may be better to simply transmit a channel assignment throughout that sector, which channel assignment will inherently address the need to transmit to the as-yet-uncontacted communication recipient.

Figure 3:
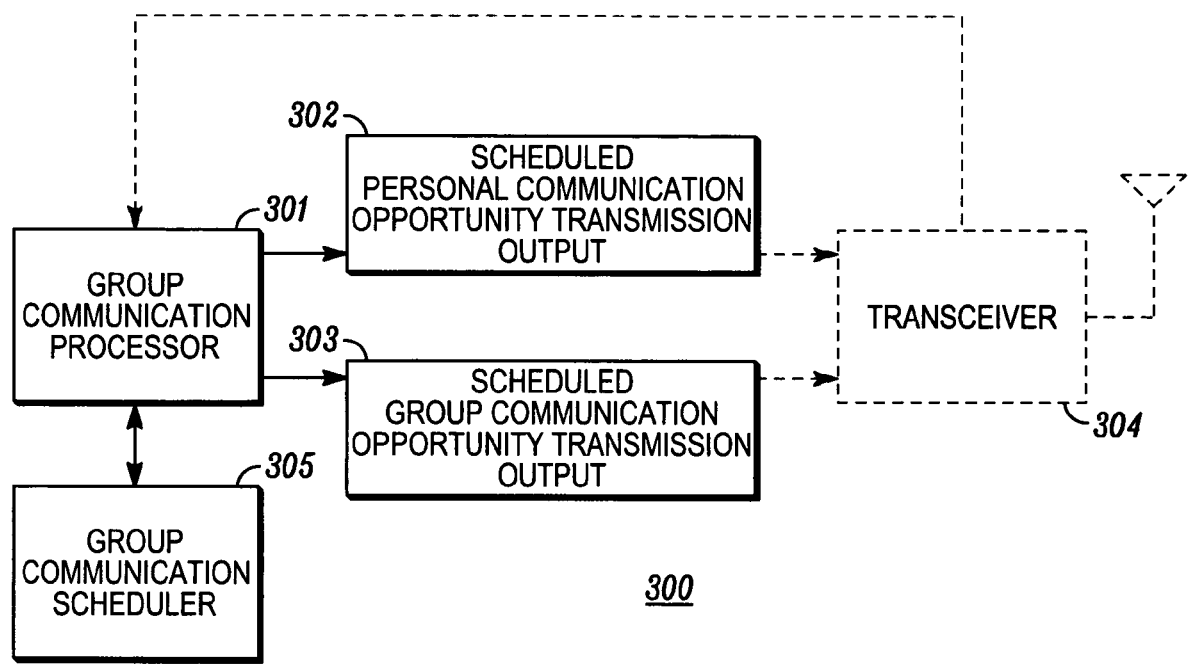
FIG. 3 comprises a block diagram as configured in accordance with various embodiments of the invention.

So configured, considerable flexibility can accompany highly leveraged use of the availability of both personal and group scheduled communication opportunities. A first-in-time approach can be either implemented in all instances if desired or can be favored, or disfavored, as a function of system or communication system dynamics of interest and choice. Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a platform will now be provided.

An exemplary apparatus 300 may be comprised of a group communication processor 301 as is otherwise understood in the art and that operably couples to both a scheduled personal communication opportunity transmission output 302 and a scheduled group communication opportunity transmission output 303. The two transmission outputs 302 and 303, in turn and pursuant to one configuration, operably couple to a transceiver 304, such as a wireless transceiver, of choice. So configured, the group communication processor 301 has the ability to use either or both of the personal and group scheduled communication opportunity transmission outputs when seeking to provide a transmission to each communication recipient as comprises a part of a corresponding group to thereby meet a particular communication need. These generally described elements (including as well their interaction and specific functionality) will of course vary from system to system but are otherwise generally well understood in the art. Accordingly, for the sake of brevity and the preservation of narrative focus no further details regarding such elements will be provided here.

This apparatus 300 also comprises, in this illustrative embodiment, a group communication scheduler 305 that operably couples to the group communication processor 301. (These elements can comprise separate physical elements as suggested by the depiction presented in FIG. 3. Those skilled in the art will also understand and appreciate, however, that two or more of these elements can share a common enabling platform and in that case the provided depiction serves more as a logical view of the apparatus 300.) In one embodiment this group communication scheduler 305 is configured and arranged (via, for example, programming that accords with the teachings set forth above) to automatically prompt use of whichever of a scheduled personal communication opportunity and a scheduled group communication opportunity occurs first for each communication recipient of a group communication as has both a scheduled personal communication opportunity and a scheduled group communication opportunity.

This arrangement can of course implement any or all of the specific embellishments as were presented earlier. For example, the group communication scheduler 305 can be configured and arranged to determine system loading and to automatically use an earliest communication opportunity as a function, at least in part, of the system loading. This can comprise, for instance, tending to automatically use whichever of the scheduled personal communication opportunity and the scheduled group communication opportunity occurs first as system loading decreases. Conversely, this can comprise tending to favor a scheduled group communication opportunity as system loading increases.

As another example, the group communication scheduler 305 can be configured and arranged to determine how many communication recipients are to receive the group communication and to then automatically use the earliest communication opportunity as a function, at least in part, of how many communication recipients are to receive the group communication. This can comprise, for instance, tending to automatically use whichever of the scheduled personal communication opportunity and the scheduled group communication opportunity occurs first as the relative (and/or absolute) number of communication recipients decreases. Conversely, this can comprise tending to favor a scheduled group communication opportunity as the number of communication recipients increases.

As yet another example, the group communication scheduler 305 can be configured and arranged, if desired, to determine whether a present location for one or more intended recipients of the group communication is known, and automatically using the scheduled personal communication opportunity for any of the intended communication recipients for which a present location is known. So configured, an earliest communication opportunity can be selected and used for each communication recipient (meaning, in this example, as between a personal and a group communication opportunity) except for communication recipients having a present known location. As to communication recipients having a present known location, a scheduled personal communication opportunity can instead be used even when a scheduled group communication opportunity might otherwise arrive at an earlier time.

Those skilled in the art will understand and recognize the great flexibility offered by these teachings. The notion of being able to select either a personal or group scheduled communication opportunity to reach various members of a predefined group in and of itself provides considerable power and capability to meet a number of varying performance goals or requirements. The ability to then modify that capability as a function of other criteria of interest (such as system loading, group size, and so forth) provides an even more extensive ability to fine tune group message processing in a way that best accommodates the unique attributes of a given communication system.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   detecting in a group communication processor a need to make at least one transmission to a group of communication recipients wherein at least one of the communication recipients has both a scheduled personal communication opportunity and a scheduled one-to-many group communication opportunity;
   a group communication scheduler determining a first criteria; and
   the group communication scheduler choosing to make the at least one transmission to the at least one of the communication recipients using whichever of the scheduled personal communication opportunity and the scheduled one-to-many group communication opportunity that occurs first unless the first criteria dictates choosing the scheduled one-to-many group communication opportunity.

2. The method of claim 1 wherein the at least one transmission comprises at least one of:
   a page;
   a user message.

3. The method of claim 1 wherein the at least one transmission comprises a wireless transmission.

4. The method of claim 1 wherein the scheduled personal communication opportunity occurs at least once per each slot cycle.

5. The method of claim 4 wherein the scheduled group communication opportunity occurs less frequently than the scheduled personal communication opportunity.

6. The method of claim 1 wherein the first criteria is system loading and wherein the group communication scheduler chooses to make the at least one transmission to the at least one of the communication recipients using the scheduled one-to-many group communication opportunity as system loading increases.

7. The method of claim 1 wherein the first criteria is a communication recipient group size and the group communication scheduler chooses to make the at least one transmission to the at least one of the communication recipients using the scheduled one-to-many group communication opportunity when the communication recipient group size is large.

8. The method of claim 1 wherein the first criteria is a present location for at least one of the communication recipients and the group communication scheduler chooses to make the at least one transmission to the at least one of the communication recipients using the scheduled one-to-many group communication opportunity when the present location is not known.

9. The method of claim 1 wherein the first criteria is a duration of time until a next opportunity to communicate to at least one of the communication recipients using the scheduled one-to-many group communication opportunity; and wherein the group communication scheduler chooses to make the at least one transmission to the at least one of the communication recipients using the scheduled one-to-many group communication opportunity so long as the duration of time does not exceed a predetermined duration.

10. An apparatus comprising:
    a group communication processor configured to detect a need to make at least one transmission to a group of communication recipients wherein at least one of the communication recipients has both a scheduled personal communication opportunity and a scheduled one-to-many group communication opportunity;
    a group communication scheduler operably coupled to the group communication processor, the group communication scheduler configured to determine a first criteria and configured to choose to make the at least one transmission to the at least one of the communication recipients using whichever of the scheduled personal communication opportunity and the scheduled one-to-many group communication opportunity occurs first unless the first criteria dictates choosing the scheduled one-to-many group communication opportunity.

11. The apparatus of claim 10 wherein the first criteria is system loading and the group communication scheduler is configured to choose to make the at least one transmission to the at least one of the communication recipients using the scheduled one-to-many group communication opportunity as system loading increases.

12. The apparatus of claim 11 wherein the first criteria is a communication recipient group size and the group communication scheduler is configured to choose to make the at least one transmission to the at least one of the communication recipients using the scheduled one-to-many group communication opportunity when the communication recipient group size is large.

13. The apparatus of claim 10 wherein the first criteria is a present location for at least one of the communication recipients and the group communication scheduler is configured to choose to make the at least one transmission to the at least one of the communication recipients using the scheduled one-to-many group communication opportunity when the present location is not known.

14. The apparatus of claim 10 wherein the first criteria is a duration of time until a next opportunity to transmit to at least one of the communication recipients using the scheduled one-to-many group communication opportunity; and wherein the group communication scheduler is configured to select to make the at least one transmission to the at least one of the communication recipients using the scheduled one-to-many group communication opportunity so long as the duration of time does not exceed a predetermined duration.

* * * * *